United States Patent [19]

Akahoshi et al.

[11] Patent Number: 5,183,591
[45] Date of Patent: Feb. 2, 1993

[54] ELECTROCONDUCTIVE RESIN COMPOSITION

[75] Inventors: Sumihisa Akahoshi; Hitoshi Akimura; Isao Nakabayashi, all of Yamaguchi; Masami Ishii, Aichi; Tamio Ohi, Aichi; Makoto Yoshida, Aichi, all of Japan

[73] Assignees: Ube Cycon, Ltd., Tokyo; Aisin Seiki Kabushiki Kaisha, Kariya, both of Japan

[21] Appl. No.: 442,590

[22] Filed: Nov. 29, 1989

[30] Foreign Application Priority Data

Dec. 5, 1988 [JP] Japan .................. 63-307478

[51] Int. Cl.$^5$ .............................. H01B 1/06
[52] U.S. Cl. ................... 252/503; 252/511; 524/495; 524/496; 523/137
[58] Field of Search ............... 252/511, 503; 524/495, 524/496; 523/137

[56] References Cited

U.S. PATENT DOCUMENTS

| | | | |
|---|---|---|---|
| 4,508,640 | 4/1985 | Kanda et al. | 252/511 |
| 4,566,990 | 1/1986 | Liu et al. | 252/511 |
| 4,569,786 | 2/1986 | Deguchi | 252/503 |
| 4,834,910 | 5/1989 | Fujii et al. | 252/511 |

*Primary Examiner*—Karl Group
*Attorney, Agent, or Firm*—Kanesaka and Takeuchi

[57] ABSTRACT

An electroconductive resin composition which is composed of a rubber-reinforced styrene resin having a controlled pH value of from 5.0 through 9.0 and a carbon material filler and a metal material filler as incorporated into the resin. A method of preparing the electroconductive resin composition where a rubber-reinforced styrene resin is adjusted to have a pH value of from 5.0 through 9.0 and a carbon material filler and a metal material filler are added to the resin.

3 Claims, No Drawings

ELECTROCONDUCTIVE RESIN COMPOSITION

FIELD OF THE INVENTION AND RELATED ART STATEMENT

The present invention relates to an electroconductive resin composition and a method for preparing the same and, in particular, it relates to an electroconductive resin composition which is suitable as a constitutional material for casings of computers or various digital electronic instruments, the casings being for the purpose of shielding the electromagnetic waves leaked from the said instruments, or is suitable as a material for heating element of heaters, or is suitable as a material for heating element sheet to be used for thawing ice and snow on the roof in winter, as well as to a method for preparing the same.

Hitherto, as a method of imparting electroconductivity to a shaping thermoplastic resin, incorporation of an electroconductive filler, for example, carbon materials such as graphite, carbon black or carbon fibers, or metal materials such as metal fibers or metal flakes, into the thermoplastic resin has been known (Japanese Patent Application Laid-Open No. 60-231764).

In the case of a carbon material filler, however, incorporation of a large amount of the filler into the thermoplastic resin is necessary for the purpose of obtaining a thermoplastic resin with good electroconductivity. Accordingly, the resulting electroconductive thermoplastic resin composition is to have a worsened shapability, or the shaped product to be formed from the resin composition is to have an extremely lowered mechanical strength. Thus, incorporation of too much carbon material filler into the thermoplastic resin is disadvantageous.

On the other hand, a metal material filler may give a better electroconductivity to the thermoplastic resin even when the amount thereof to be added to the resin is smaller than the case of using the carbon material filler. However, the resulting metal material filler-containing resin composition has a large specific gravity and the cost of the composition is high. Accordingly, incorporation of such metal material filler is also disadvantageous.

Under the situation, combination of the carbon material filler and the metal material filler for the purpose of compensating the drawbacks of the two fillers has been proposed (Japanese Patent Application Laid-Open No. 58-87142).

While the carbon material filler-containing thermoplastic resin composition is stable almost without the time-dependent variation of the electroconductivity thereof, the metal matrial filler-containing thermoplastic resin composition has a drawback that the time-dependent variation of the electroconductivity of the composition is large and the volume-intrinsic resistance value is time-dependently varied to be higher with the lapse of time. Such drawback could not be overcome even by the combination of the carbon material filler and the metal material filler.

Accordingly, where the conventional electroconductive thermoplastic resin composition is used as a constitutional material for the casings to shield the electromagnetic waves leaked from the digital electronic instruments, the shielding effect would worsen time-dependently. On the other hand, where the composition is used as a material for heaters, the temperature-controlling capacity of the heater would lower time-dependently. As the conventional electroconductive thermoplastic resin materials have such troubles in practical use, they are unsuitable for use in the field.

OBJECT AND SUMMARY OF THE INVENTION

The object of the present invention is to overcome the above-mentioned problems in the prior art and to provide an electroconductive resin composition which may maintain the excellent shapability and workability of the thermoplastic resin and which may also maintain the mechanical characteristics of the resin when formed into shaped products, as well as to provide a method for preparing such resin composition. The resin composition has excellent electroconductive characteristic and time-dependent stability, and it has a relatively low specific gravity and is low-priced.

Another object of the present invention is to provide an electroconductive resin composition which is suitable as a constitutional material for electromagnetic wave-shielding casings for electronic instruments or is suitable as a constitutional material for sheet heaters, as well as to provide a method for preparing such resin composition. Where the resin composition is used as the constitutional material for the casings, it may maintain the excellent electromagnetic wave-shielding effect for a long period of time. Where the composition is used as the constitutional material for sheet heaters, it may maintain the excellent temperature-controlling function for a long period of time.

In order to satisfy the objects, there is provided in accordance with the present invention an electroconductive resin composition which is composed of a rubber-reinforced styrene resin having a controlled pH range from 5.0 to 9.0 and a carbon material filler and a metal material filler incorporated into the resin.

There is further provided in accordance with the present invention, a method of preparing an electroconductive resin composition in which a rubber-reinforced styrene resin is adjusted to have a pH value from 5.0 to 9.0 and a carbon material filler and a metal material filler are added to the resin.

In accordance with the present invention, the pH value of the resin component is controlled to fall within the range from 5.0 to 9.0, whereby the stability of the electroconductivity of the resin composition is extremely improved. Accordingly, the time-dependent deterioration of the electroconductivity of the resin composition may be prevented and a product which is durable for a long period of time can be prepared from the resin composition of the present invention.

DESCRIPTION OF THE PREFERRED EMBODIMENTS

Next, the present invention will be explained in detail hereunder.

The electroconductive resin composition of the present invention is composed of a rubber-reinforced styrene resin having a controlled pH value of 5.0 through 9.0 and a carbon material filler and a metal material filler incorporated into the resin. As the styrene resin for constituting the rubber-reinforced styrene resin to be employed in the present invention, there are mentioned one or more selected from the group consisting of high-impact styrene, polystyrene, acrylonitrile-butadiene-styrene copolymer (ABS resin), methyl methacrylate-acrylonitrile-butadiene-styrene copolymer (MABS resin), methyl methacrylate-butadiene-styrene copolymer (MBS resin), acrylonitrile-ethylene-propylene-styrene resin (AES resin) and ASA resin. In the present invention, in particular, employment of rubber-reinforced polystyrene or rubber-reinforced terpolymers comprising vinyl-aromatic, acrylonitrile and/or acrylate monomers, such as rubber-reinforced ABS resin, rubber-reinforced MABS resin, rubber-reinforced MBS resin or rubber-reinforced AES resin, is preferred.

As the carbon material filler for use in the present invention, there are mentioned one or more of graphite, carbon fibers and carbon black. Among them, carbon black includes furnace black, ketjen black and acetylene black.

As the metal material filler for use in the present invention, there are mentioned flakes or fibers of one or more of copper, brass, aluminium and stainless steel.

The proportion of the respective components to be blended is not specifically limited but may be determined in any desired ratio in accordance with the use and with the balance of the specific gravity, price and characteristics of the resin composition to be obtained. In general, it is preferred that the amount of the carbon material filler is from 5 to 30 parts by weight and that of the metal material filler is from 10 to 150 parts by weight, per 100 parts by weight of the rubber-reinforced styrene resin, in view of the shapability and strength of the resin as well as the electroconductivity and stability of the resin composition.

Next, a preferred method for preparing the electroconductive resin composition of the present invention will be explained hereunder.

In accordance with the present invention of preparing the resin composithon, the rubber-reinforced styrene resin is first adjusted to have the determined pH value and then the determined amounts of carbon material filler and metal material filler are added thereto. In general, the rubber-reinforced styrene resin for use in the present invention contains various chemical substances such as the catalyst as employed in polymerization as well as other various polymerization stabilizers and so on. In addition, other various inorganic or organic compounds such as polymer-separating agents and so on are further incorporated into the resin, when it is blended and kneaded with the other components. Accordingly, the pH value of the resin composition to be obtained would fall within a broad range, although the polymers themselves are neutral, since various chemical agents are used in the manufacture step thereof.

In accordance with the present invention, the pH value of the rubber-reinforced styrene resin to be employed is controlled to fall within the range of 5.0 through 9.0. For this, a method of adding a pertinent acidic or alkaline agent to the resin so as to neutralize the resin may be employed. In addition, another method of adding a buffer for the purpose of controlling the pH value may also be employed. The chemical agent may be added to the resin (polymer) in any step of the method of preparing the same, and the amount thereof to be added is pertinently determined so that the final polymer may have a controlled pH value of 5.0 through 9.0. The acid employable for the purpose includes, for example, sulfuric acid and acetic acid; and the alkali also employable for the purpose includes, for example, potassium hydroxide and sodium hydroxide. The buffer employable for the purpose includes, for example, calcium chloride and magnesium oxide.

In general, the method of the present invention can be carried out, for example, as follows. Precisely, a rubber-reinforced styrene resin and a carbon material filler are first melted and keanded in a Bumbury's mixer and then pelletized. In the melting and keanding step, the above-mentioned chemical agents may properly be added to the blend so as to adjust the pH value of the resulting blent to a determined range. Next, the resulting pellets are further blended with a metal material filler and melted and kneaded with an extruder and then pelletized.

The pH value of the resin for use in the present invention is one obtained by measuring the pH value of a resin solution with a pH meter, the resin solution being prepared by dissolving 5 g of the resin to be measured in 100 ml of tetrahydrofuran (THF) followed by adding 10 ml of distilled water thereto.

As explained in detail in the above, since the electroconductive resin composition of the present invention contains both the carbon material filler and the metal material filler, the resin composition has a high elector-conductivity and excellent shapability and mechanical strength because of the effects of the combined two fillers, and additionally, the composition has a relatively low specific gravity and is low-priced.

Moreover, since the rubber-reinforced styrene resin component in the electroconductive resin composition of the present invention is controlled to have a particular pH range, the stability of the electroconductive characteristics of the resin composition is extremely elevated, and the resin composition may maintain the excellent electroconductivity for a long period of time.

Where the electroconductive resin composition of the present invention is used as the constitutional material for casings for shielding the electromagnetic waves leaked from electronic instruments, the shielding effect may be maintained for a long period of time. In addition, where the composition is used as the constitutional material for sheet heaters, the high temperature-controlling function may be maintained for a long period of time. Accordingly, electroconductive resin composition of the present invention is industrially extremely useful.

In accordance with the method of the present invention, the electroconductive resin composition having such excellent characteristics can be prepared easily and efficiently.

Next, the present invention will be explained concretely with reference to the following examples and comparative examples. However, the present invention is not restricted by the following examples, without departing from the scope and spirit thereof.

EXAMPLES 1 TO 7, COMPARATIVE EXAMPLES 1 to 4

ABS resin prepared by emulsion polymerization and carbon black were melted and kneaded with Bumbery's mixer to prepare pellets, whereupon the pH value of the blend was adjusted by the method as indicated in Table 1 below. The resulting pellets were dry-blended with metal fibers and then the resulting blend was melted and kneaded with an extruder to prepare pellets. The proportion of the respective fillers employed is shown in Table 2 below.

TABLE 1

| ABS Sample | Controlled pH of ABS | Coagulant for ABS | Form of ABS for pH Adjustment | Method of Adjusting pH of ABS |
|---|---|---|---|---|
| No. 1 | 3.3 | Acid | Latex | Latex was coagulated with acid ($H_2SO_4$). |
| No. 2 | 8.0 | Acid | Latex, Slurry | NaOH was added to slurry until the slurry had the intended pH value. |
| No. 3 | 8.5 | Acid | Latex, Powder | Ma(OH)$_2$ was added to ABS and carbon black in the step of blending them, until the resulting blend could have the intended pH value. |
| No. 4 | 6.5 | Acid | Latex, Powder | $CaCO_3$ was added to ABS and carbon black in the step of blending them, until the resulting blend could have the intended pH value. |
| No. 5 | 11.4 | Salt | Latex | Latex was coagulated with salt ($CaCl_2$). |
| No. 6 | 5.2 | Salt | Lates, Powder | Maleic anhydride was added to ABS and carbon black in the step of blending them, until the resulting blend could have the intended pH value. |
| No. 7 | 5.4 | Salt | Latex, Powder | $CH_3COOH$ was added to slurry until the slurry had the intended pH value. |

Next, using a two-ounce injection moulding machine, the pellets were shaped into pieces having a size of $100 \times 100 \times 2.5$ mm. These were used for measuring the volume-intrinsic resistance value.

An electroconductive silver paint (D-500, product of Fujikura Chemical Co.) was coated on both edges of the thus prepared test pieces, and the resistance between the two edges of the plate (test piece) was measured with a resistometer (Advantest, Digital Multimeter TR6856) under the condition of a temperature of 23° C. and a relative humidity of 55%. Accordingly, the volume-intrinsic resistance of the test piece was obtained from the following formula:

$$\text{Volume-intrinsic Resistance } (\Omega \cdot cm) = 10 \times 0.25 \times R/10$$

where R means the value as indicated by the resistometer.

The time-dependent variation of the volume-intrinsic resistance value is shown in Table 2 below.

From the data shown in Table 2, it is obvious that the electroconductive resin composition samples of the present invention have an extremely high stability of the electroconductive characteristic and therefore they are almost free from time-dependent deterioration of the electroconductivity.

What is claimed is:

1. An electroconductive resin composition comprising 100 parts by weight of a rubber-reinforced styrene resin prepared by emulsion polymerization to have a controlled pH value of 5.0 through 9.0, 5 to 30 parts by weight of a carbon material filler and 10 to 150 parts by weight of a metal material filler incorporated into said resin, said rubber-reinforced styrene resin being at least one member selected from the group consisting of butadiene-styrene copolymer, polystyrene, acrylonitrile-butadiene-styrene copolymer, methyl methacrylate-acrylonitrile-butadiene-styrene copolymer, methyl methacrylate-butadiene-styrene copolymer, acrylonitrile-ethylene-propylene-styrene resin and acrylate styrene acrylonitrile resin, and said metal material filler being fibers or flakes of at least one member selected from the group consisting of copper, brass, aluminum and stainless steel, said electroconductive resin composition having volume-intrinsic resistance value under 4.9 ohm cm, ratio from initial value to value after one year of said volume-intrinsic resistance value being between 1.000 and 1.066.

2. The electroconductive resin composition as claimed in claim 1, in which the carbon material filler is at least one material selected from the group consisting of graphite, carbon black and carbon fibers.

3. The electroconductive resin composition as claimed in claim 2, in which the carbon black is at least one material selected from the group consisting of furnace black and acetylene black.

TABLE 2

| Examples | ABS Resin Sample No. | ABS Resin pH | ABS Resin phr | Carbon Material Filler (wt %) ketjen Carbon Black | Carbon Material Filler (wt %) Furnace Carbon Black | Carbon Material Filler (wt %) Carbon Fibers | Metal Material Filler (wt. %) Brass Fibers | Metal Material Filler (wt. %) Aluminium Fibers | Volume-intrinsic Resistance Value ($\Omega$cm) Initial Value | Volume-intrinsic Resistance Value ($\Omega$cm) After 1 month | Volume-intrinsic Resistance Value ($\Omega$cm) After 3 months | Volume-intrinsic Resistance Value ($\Omega$cm) After 4 months | Volume-intrinsic Resistance Value ($\Omega$cm) After 1 year |
|---|---|---|---|---|---|---|---|---|---|---|---|---|---|
| Comparative Example 1 | 1 | 3.3 | 61 | 8 | — | — | 31 | — | 1.8 | 5.4 | 10.8 | 16.2 | 32.4 |
| Example 1 | 2 | 8.0 | 61 | 8 | — | — | 31 | — | 1.5 | 1.6 | 1.6 | 1.6 | 1.6 |
| Example 2 | 3 | 8.5 | 61 | 8 | — | — | 31 | — | 1.9 | 1.9 | 2.0 | 2.0 | 2.0 |
| Example 3 | 4 | 6.5 | 61 | 8 | — | — | 31 | — | 1.7 | 1.7 | 1.7 | 1.7 | 1.7 |
| Comparative Example 2 | 1 | 3.3 | 68 | — | 14 | — | — | 18 | 4.9 | 5.3 | 10.5 | 16.0 | 21.0 |
| Example 4 | 2 | 8.0 | 68 | — | 14 | — | — | 18 | 4.3 | 4.4 | 4.4 | 4.4 | 4.4 |
| Comparative Example 3 | 1 | 3.3 | 75 | 4 | — | 2 | 19 | — | 4.5 | 6.8 | 13.5 | 20.3 | 27.0 |
| Example 5 | 2 | 8.0 | 75 | 4 | — | 2 | 19 | — | 4.8 | 4.9 | 4.9 | 4.9 | 4.9 |
| Comparative Example 4 | 5 | 11.4 | 61 | 8 | — | — | 31 | — | 2.0 | 6.1 | 12.1 | 17.5 | 21.5 |
| Example 6 | 6 | 5.2 | 61 | 8 | — | — | 31 | — | 1.9 | 2.0 | 2.0 | 2.0 | 2.0 |
| Example 7 | 7 | 5.4 | 61 | 8 | — | — | 31 | — | 1.7 | 1.8 | 1.8 | 1.8 | 1.8 |

* * * * *